United States Patent [19]

Legille et al.

[11] Patent Number: 4,597,694
[45] Date of Patent: Jul. 1, 1986

[54] DEVICE FOR INTRODUCING DOSED QUANTITIES OF PULVERIZED MATERIALS INTO A CARRIER GAS STREAM AND APPLICATION THEREOF TO A DISTRIBUTION TANK FOR PULVERIZED MATERIALS

[75] Inventors: Edouard Legille, Luxembourg; Pierre Mailliet, Howald; Jeannot Loutsch, Itzig; Jean-Pierre Welter, Grevenmacher, all of Luxembourg

[73] Assignee: Paul Wurth S.A., Luxembourg, Luxembourg

[21] Appl. No.: 604,465

[22] Filed: Apr. 27, 1984

[30] Foreign Application Priority Data

Apr. 28, 1983 [LU] Luxembourg ............................ 84780

[51] Int. Cl.[4] ....................... G01F 11/42; B65G 53/46
[52] U.S. Cl. ....................................... 406/129; 222/317
[58] Field of Search .................. 406/93, 128, 129, 144; 222/504, 548, 555, 557, 560, 317; 239/682, 670, 687

[56] References Cited

U.S. PATENT DOCUMENTS 3,655,104 4/1972 Larson et al. ...................... 222/317

FOREIGN PATENT DOCUMENTS

| 13041 | 4/1900 | United Kingdom | ................ 239/682 |
| 540153 | 10/1941 | United Kingdom | ................ 222/557 |
| 1493525 | 11/1977 | United Kingdom . | |
| 2034657 | 6/1980 | United Kingdom | ................ 406/129 |
| 371147 | 5/1973 | U.S.S.R. | ................ 406/129 |

*Primary Examiner*—Jeffrey V. Nase
*Assistant Examiner*—Mary Beth O. Jones
*Attorney, Agent, or Firm*—Fishman & Dionne

[57] ABSTRACT

A device for introducing dosed or proportioned quantities of pulverized solid materials into a carrier gas stream is presented. The device comprises a housing which defines a flow chamber in the axial direction for the flow of pressurized fluid or carrier gas. The housing also has a side aperture therethrough. The side aperture is connected to a container holding pulverized materials. Coaxial inner and outer sleeves, at least one of which is capable of rotation, are located within the housing. The outer sleeve communicates with the aperture while the inner sleeve has an axial bore which provides a passage for the carrier gas. Upon rotation of a sleeve, slots provided on each sleeve will align and overlap with each other and with the aperture to define a variable sized passage between the container and axial bore whereby the pulverized material is delivered therethrough to the carrier gas stream. A third sleeve which is coaxial with the inner and outer sleeves and rotatable about its longitudinal axis is located between the housing and the outer sleeve. This third sleeve has a radial aperture corresponding to the side aperture of the housing. The third sleeve acts as a valve between the dosing device and a distribution tank.

10 Claims, 7 Drawing Figures

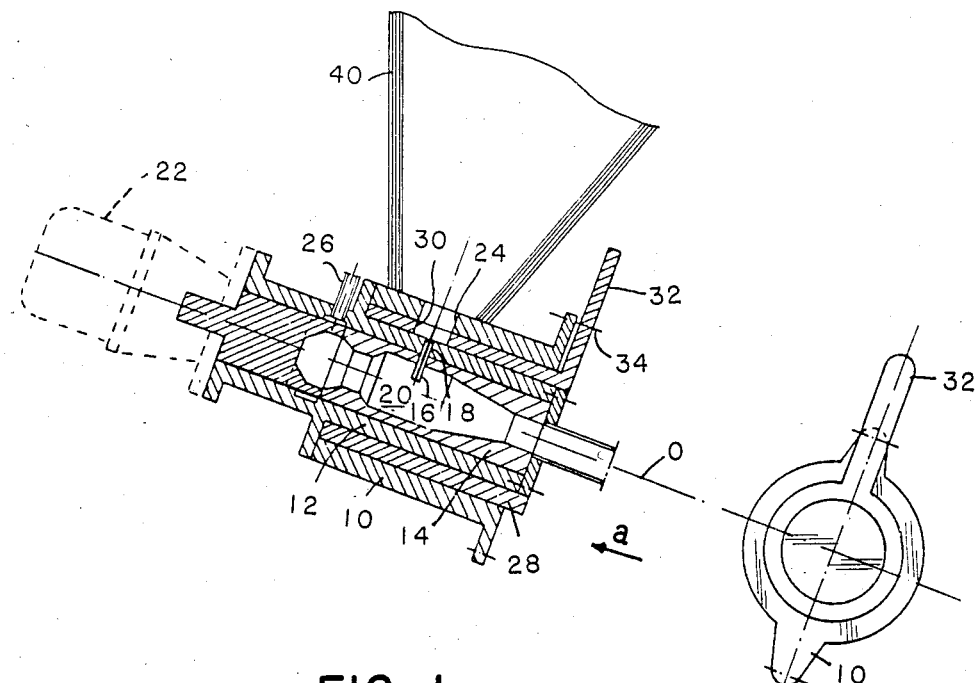
FIG. 1
FIG. 1a
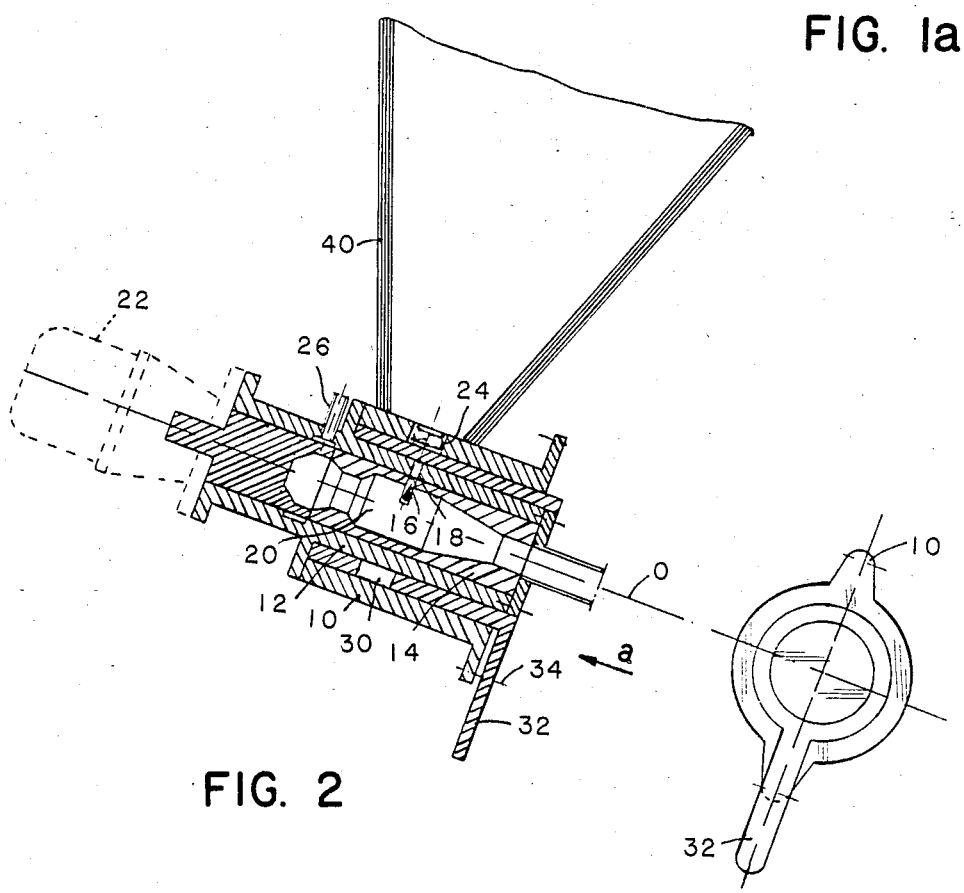
FIG. 2
FIG. 2a

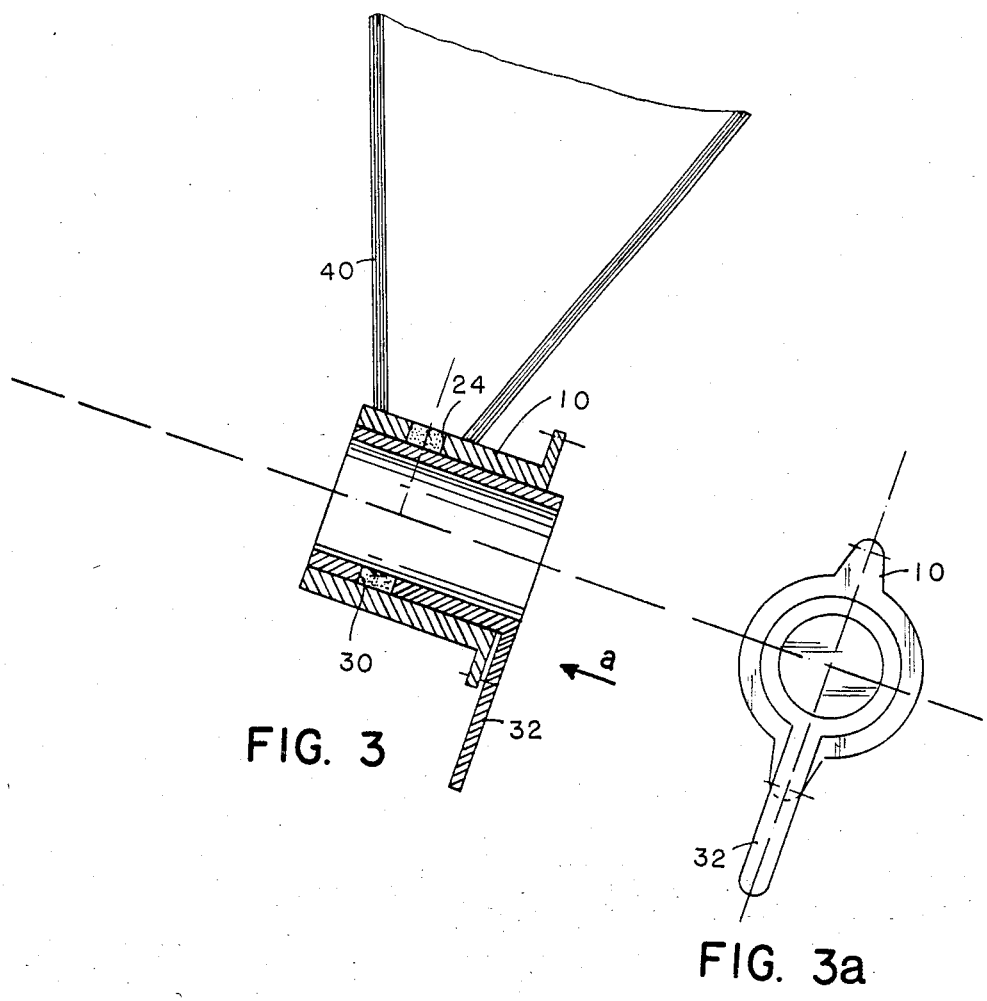
FIG. 3
FIG. 3a
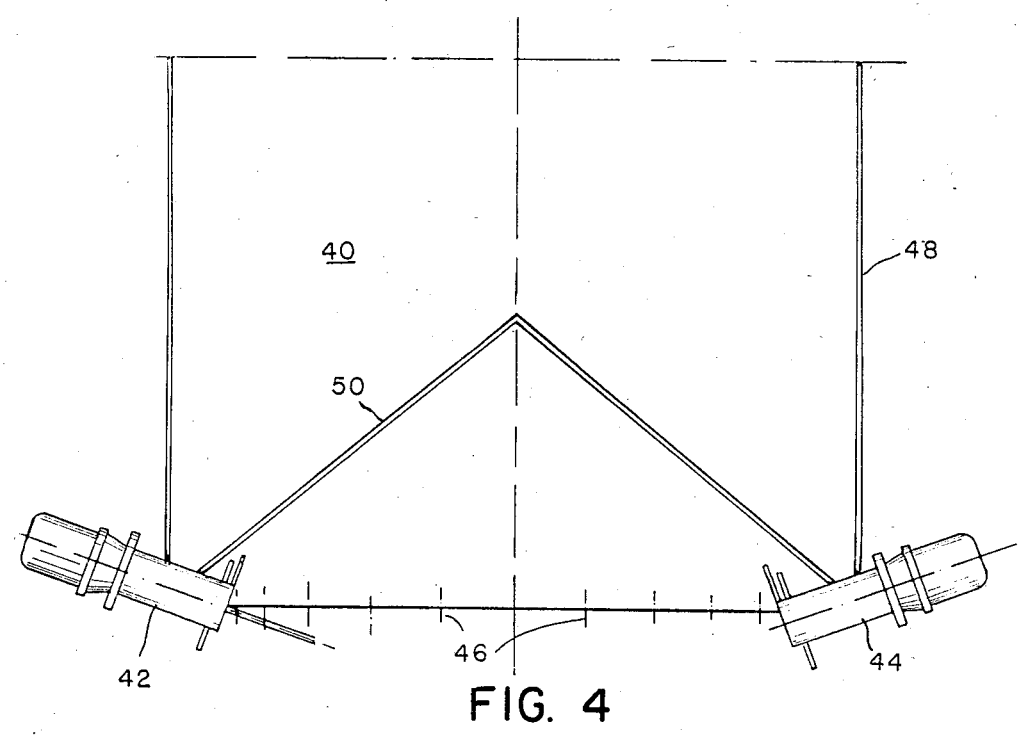
FIG. 4

DEVICE FOR INTRODUCING DOSED QUANTITIES OF PULVERIZED MATERIALS INTO A CARRIER GAS STREAM AND APPLICATION THEREOF TO A DISTRIBUTION TANK FOR PULVERIZED MATERIALS

BACKGROUND OF THE INVENTION

The present invention relates to an apparatus for introducing measured or dosed quantities of pulverized or pulverulent materials into a carrier gas stream. This invention also relates to the application of the aforementioned apparatus to a tank for the distribution of pulverized materials.

An apparatus for proportioning and extracting pulverized materials from a distribution tank of the type herein discussed, has been disclosed in Luxembourg patent application No. 84-462 corresponding to U.S. patent application Ser. No. 550,565, assigned to the assignee hereof, all the contents of which are incorporated herein by reference. The invention described in the pending U.S. patent application Ser. No. 550,565 is particularly applicable to the operation of injecting solid fuels into a shaft furnace during a metal refining process. In this particular field of application, one dosing device is provided for each tuyere stock, or at the most, for each pair of tuyere stocks, such that a whole set of dosing devices are required for the distribution and intermediates storage tanks used to store the pulverized materials. As a consequence and particularly, for maintenance purposes, in order to dismantle a dosing device, it is necessary either to provide a shut-off valve between each dosing device in the tank or alternatively, to shut down the tank and each of the dosing devices. This time consuming and expensive shutdown must be performed each time maintenance work is to be carried out on a particular device or tank.

SUMMARY OF THE INVENTION

The above discussed and other problems of the prior art are overcome or alleviated by the apparatus of the present invention. In accordance with the present invention, an improved dosing device of the type disclosed in U.S. patent application Ser. No. 550,565 is provided which permits each individual unit i.e., tank or dosing device to be dismantled and repaired without the need of a shut off valve. The dosing device of the present invention may be mounted directly onto a distribution tank for pulverized materials.

The present invention comprises a preferably cylindrical housing partially traversed in the axial direction by a pressurized fluid or carrier gas. The housing also has a side or radial aperture opening which communicates with a tank containing pulverized solid material. The pressure in the tank should be about of that of the carrier gas. The housing furthur contains two coaxial sleeves defined as a inner sleeve and an outer sleeve. The inner sleeve has a axial bore which provides passage therethrough to the carrier gas. At least one of the two sleeves is capable of rotating about its longitudinal axis and is connected for this purpose to a suitable device for imparting rotation. Each of the sleeves is further provided with a slot positioned so as to correspond with each other and with the side or radial aperture on the housing. Thus, the slots are permitted to meet and overlap each other as the rotatable sleeve rotates about its axis. Preferably, the slots in both sleeves are identical in shape and thereby complimentary. The overlapping and identical slots on the inner and outer sleeve thus defines a passage of varying size (depending on the position of the rotating sleeve). This passage allows pulverized material in the tank to pass through the carrier gas stream which flows through the inner sleeve.

The above description is substantially identical to the dosing device disclosed in U.S. patent application Ser. No. 550,565. In accordance with the present invention, the prior art device is improved by the addition of a third movable coaxial sleeve positioned between the housing and the other two coaxial sleeves. This third sleeve is provided with a side aperture corresponding to the side or radial aperture of the housing. The third sleeve is also provided with a driving mechanism which acts to urge the third sleeve to rotate about its longitudinal axis. This driving mechanism may consist of a simple handle which is integral with the aforementioned third sleeve.

In a preferred embodiment of the present invention, means are provided for locking the driving mechanism i.e., handle and sleeve in a first angler position in which the aperture of the sleeve and the anguler position of the housing coincide. This locking means will also lock the handle and third sleeve in a second angler position 180° away from the first angler position.

The dosing device of the present invention allows maintenance operations to be carried out by separating the housing and third sleeve from the remainder of the device and by removing the first two sleeves by a translatory movement in the axial direction. The third sleeve thus functions as a valve means and therefore makes it possible, in the case of a number of dosing devices combined with a single distribution tank, to dismantle each dosing device individually without having to put the other units out of operation.

The dosing device of the present invention also enables safety devices to be provided thereto which prevent the dosing device from being dismantled unless the driving mechanism i.e., "handle" occupies the second anguler position, wherein the dosing devices are isolated from the distribution tank.

In one advantageous application of the present invention, a tank for the distribution of pulverized materials is presented wherein pulverized materials are removed therefrom through a plurality of dosing devices of the type hereinabove discussed. The distribution tank is preferably comprised of a cylinder having a conical shaped base, the point of which extends into the interior of the cylindrical tank. Plural dosing devices of the present invention are then attached to the tank at the intersection between the cylindrical side walls and the conical base.

Each dosing device is preferably inclined relative to the side wall of the distribution tank, such that its longitudinal axis is approximately perpendicular to the conical surface generated by the bisector of the angle between the cylindrical side walls and the conical base of the tank.

The novel construction of the present invention is permitted as it is no longer necessary to provide intermediate shut off valves between the dosing devices and the distribution tank. Moreover, this structure has the advantage of being more compact, i.e., the device occupys more space and is easier to maintain relative to dosing devices described in the prior art.

The above discussed and other advantages of the present invention will be apparent to and understood by those skilled in the art from the following detailed description and drawings.

BRIEF DESCRIPTION OF THE DRAWINGS

Referring now to the drawings wherein like elements are numbered alike in the several FIGURES:

FIG. 1 is a cross-sectional elevation view of the dosing apparatus in accordance with the present invention.

FIG. 1A is a schematic view of the dosing device in accordance with the present invention taken in the direction shown by the arrow A in FIG. 1.

FIG. 2 is a cross-sectional elevation view of the dosing device of FIG. 1 in a closed position after dismantling.

FIG. 2A is a schematic view taken in the direction shown by the arrow A in FIG. 2.

FIG. 3 is a cross-sectional elevation view of the dosing device of FIG. 1 showing the body of the device dismantled.

FIG. 3A is a schematic view taken in the direction shown by the arrow A in FIG. 3.

FIG. 4 is a schematic diagram of a distribution tank equipped with dosing device in accordance with the present invention.

DESCRIPTION OF THE PREFERRED EMBODIMENT

The dosing device for measuring or proportioning pulverized or pulverulent materials and introducing measured quantities thereof into a carrier gas stream is generally shown in FIGS. 1 and 2 and is closely related to the dosing device disclosed in Luxembourg patent application No. 84-462 corresponding to U.S. patent application Ser. No. 550,565. The dosing device disclosed in the prior U.S. patent application comprises a cylindrical housing 10 containing therein, two coaxial cylindrical sleeves 12 and 14 defined as an outer sleeve 12 and inner sleeve 14. In the illustrated embodiment, the outer sleeve 12 is fixed in position and integral with the housing 10 while the inner sleeve 14 can freely rotate about the longitudinal axis 0. The two sleeves 12 and 14 are each provided with radial slots 18 and 16 respectively. Running longitudinally along the inside center of inner sleeve 14 is axial bore 20. Slots 16 and 18 define a passage for the entry of pulverized material into chamber 20, the passage having a size that will vary according to the anguler position occupied by the movable or rotatable sleeve 14. This variable passage permits the flow of pulverized material to vary between a maximum when the slots are completely superimposed to a minimum when the slots no longer coincide and the pulverized material is prevented from flowing into chamber 20. The rotation of movable socket 14 is provided by means of a device which is well known in the art and represented by the broken lines 22. This device is described in more detail in the aforementioned U.S. patent application Ser. No. 550,565.

Housing 10 is provided with a side aperture 24 for the entry of pulverized material via slots 12 and 14 into chamber 20, wherein the pulverized material is mixed with pressurized air, the air entering through a pipe 26.

The primary difference between the dosing device disclosed in the aforementioned U.S. patent application Ser. No. 550,565 and the present invention is the presence of an intermediate cylindrical sleeve 28 provided between chamber 10 and fixed outer sleeve 12. Intermediate sleeve 28 is similarly rotatable about axis 0 and is provided with a radial aperture 30. Aperture 30 is identical with and corresponds to the radial aperture 20 for housing 10. In effect, intermediate sleeve 28 functions as a valve in as much as when the two apertures 24 and 30 coincide, the valve opens thereby enabling the pulverized material to pass through slots 16 and 18 (see FIG. 1). However, after rotation of sleeve 28, particularly through an angle of 180°, (FIG. 2) the movement of the pulverized material toward the interior of chamber 20 is effectively stopped or interrupted.

The rotation of intermediate sleeve 28 i.e., the operation of which may be termed a valve, may be carried out by any suitable rotating means, such as, for example, a simple handle 32 which is integral with sleeve 28. It will be appreciated that reference numerial 34 indicates bolts for locking the valve i.e., sleeve 28, either in the open position shown in FIG. 1 or in the closed position shown in FIG. 2.

In accordance with an important feature of the present invention, the internal body of the design device which is defined as the inner and outer sleeve 12 and 14 and by the driving mechanism 22 for the movable sleeve 14, may be separated as one piece. This one piece removal is effected by a translatory movement in the axial direction so that the internal body is withdrawn from the remainder of the apparatus thereby leaving only the housing 10 and intermediate or valve sleeve 28. FIG. 3 shows the housing 10 and valve sleeve 28 after the extraction of the internal body of the dosing device of the present invention.

As discussed, the primary purpose of valve sleeve 28 is to isolate the pulverized materials from the distribution tank (such as tank 40 shown in FIGS. 1–3), so as to permit the internal body of the device to be easily dismantled. Accordingly, in a preferred embodiment, safety means are provided which prevent the internal body of the dosing device from being withdrawn unless the sleeve 28 and handle 32 are in a closed position as shown in FIGS. 2 and 3. A safety device of this type may consist of a simple bayonet connection comprising, for example, a series of peripheral grooves on sleeve 12 and an internal lug on sleeve 28 or vice-versa.

Since the novel presence of valve sleeve 28 allows a conventional valve between the dosing device and the distribution tank to be dispensed with (as opposed to prior art devices), housing 10 may be directly mounted to a distribution tank as shown in FIGS. 1–4.

FIG. 4 is a schematic diagram showing the dosing device in accordance with the presence invention connected to a distribution tank 40 for pulverized material, particularly coal dust. Preferably, distribution tank 40 is substantially cylindrical shape having side walls 48. Distribution tank 40 also includes a base 50 having a conical shape, the point of which extends into the interior of tank 40. FIG. 4 also shows two dosing devices 42 and 44 which may be connected to tank 40 by mounting each device 42,44 at the intersection point between the side wall 48 and base 50. This assembly process can be effected by welding housing 10 to base 50 and wall 48. It will be appreciated that reference number 46 schematically symbolizes other dosing devices which may be evenly distributed about the base of tank 40.

Note that dosing devices 42, 44 and 46 are preferably inclined relative to distribution tank 40, so that their longitudinal axes are substantially perpendicular to a virtually conical surface generated by the bisector of the angle formed between the side wall 48 and the conical base 50 of distribution tank 40. This particular orientation has been found to be preferred and most effective.

In accordance with the present invention then, maintenance operations are improved as the interior of each dosing device may be removed simply by closing valve sleeve 28. Thus, each dosing device 42,44 and 46 may be individually dismantled without having to dismantle the other dosing devices.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for introducing pulverized materials in a carrier gas stream comprising:
    housing means, said housing means having an axial flow passage for a pressurized carrier gas stream;
    aperture means in said housing for delivery of pulverized material;
    inner sleeve means in said housing and extending across said aperture means, said inner sleeve means having an axial bore, said bore providing a passage for the carrier gas stream;
    outer sleeve means, said outer sleeve means being coaxial with said inner sleeve means and extending across said aperture means, at least one of said outer and inner sleeve means being rotatable about its longitudinal axis;
    means for rotating at least one of said outer and inner sleeve means;
    at least a first slot on said inner sleeve means and at least a second slot on said outer sleeve means, said first and second slots being capable of mutual overlapping alignment with each other and with said aperture to define a variable sized passage whereby pulverized material is delivered therethrough in said carrier gas stream;
    valve sleeve means, said valve sleeve means being coaxial with said inner and outer sleeve means and being rotatable about its longitudinal axis, said valve sleeve means being located between said housing and said outer sleeve means, said valve sleeve means having radial aperture means corresponding to said aperture means in said housing;
    means for rotating said valve sleeve means;
    means for locking said valve sleeve means in at least a first angular position wherein said aperture means of said valve sleeve means and of said housing means coincide and a second angular position wherein said aperture means of said valve sleeve means and said housing means do not coincide;
    wherein said inner and outer sleeve means are capable of being removed as one-piece from said housing means and said valve sleeve means, said inner and outer sleeve means being removed via translatory movement in the axial direction;
    tank means for distributing pulverized materials into said aperture means of said housing means; and
    said tank means including cylindrical side walls defining an interior and exterior, and a base, said base having a conical shape, the conical base extending upwardly into the interior of said tank means and wherein said aperture means of said housing means is attached to said tank means at the intersection between said sidewalls and said conical base.

2. The dosing device of claim 1 wherein:
    said inner sleeve is rotatable about its longitudinal axis; and
    said outer sleeve is fixedly engaged within said housing.

3. The dosing device of claim 1 wherein said valve sleeve means rotating means comprises:
    handle means, said handle means being attached to said valve sleeve means.

4. The dosing device of claim 3 including:
    means for locking said handle in at least a first angular position wherein said aperture means of said valve sleeve and of said housing coincide, and a second angular position wherein said aperture means of said valve sleeve and said housing do not coincide.

5. The dosing device of claim 4 wherein:
    said second angular position is about 180° degrees from said first angular position.

6. The dosing device of claim 1 wherein:
    said second angular position is about 180° degrees from said first angular position.

7. The dosing device of claim 1 wherein:
    said housing means is inclined relative to said cylindrical sidewalls of said distribution tank means wherein the longitudinal axis of said housing means is approximately perpendicular to the conical surface generated by the bisector of the angle between the sidewall and the base of said tank means.

8. A distribution tank for pulverized material and a device attached thereto for introducing pulverized materials in a carrier gas stream comprising:
    housing means, said housing means having an axial flow passage for a pressurized carrier gas stream;
    aperture means in said housing for delivery of pulverized material;
    inner sleeve means in said housing and extending across said aperture means, said inner sleeve means having an axial bore, said bore providing a passage for the carrier gas stream;
    outer sleeve means, said outer sleeve means being coaxial with said inner sleeve means and extending across said aperture means, at least one of said outer and inner sleeve means being rotatable about its longitudinal axis;
    means for rotating at least one of said outer and inner sleeve means;
    at least a first slot on said inner sleeve means and at least a second slot on said outer sleeve means, said first and second slots being capable of mutual overlapping alignment with each other and with said aperture to define a variable sized passage whereby pulverized material is delivered therethrough to said carrier gas stream;
    valve sleeve means, said valve sleeve means being coaxial with said inner and outer sleeve means and being rotatable about its longitudinal axis, said valve sleeve means being located between said housing and said outer sleeve means, said valve sleeve means having radial aperture means corresponding to said aperture means in said housing;
    means for rotating said valve sleeve means;
    means for locking said valve sleeve means in at least a first angular position wherein said aperture means of said valve sleeve means and of said housing means coincide and a second angular position wherein said aperture means of said valve sleeve means and said housing means do not coincide;
    wherein said inner and outer sleeve means are capable of being removed as one-piece from said housing means and said valve sleeve means, said inner and outer sleeve means being removed via translatory movement in the axial direction;

tank means for distributing pulverized materials into said aperture means